United States Patent
Princivalle

(10) Patent No.: US 9,964,033 B2
(45) Date of Patent: May 8, 2018

(54) TWO-SPOOL DESIGN FOR A TURBOSHAFT ENGINE WITH A HIGH-PRESSURE COMPRESSOR CONNECTED TO A LOW-PRESSURE TURBINE

(75) Inventor: Remy Princivalle, Pau (FR)

(73) Assignee: TURBOMECA, Bordes (FR)

( * ) Notice: Subject to any disclaimer, the term of this patent is extended or adjusted under 35 U.S.C. 154(b) by 871 days.

(21) Appl. No.: 14/126,578

(22) PCT Filed: Jun. 7, 2012

(86) PCT No.: PCT/FR2012/051273
§ 371 (c)(1),
(2), (4) Date: Dec. 16, 2013

(87) PCT Pub. No.: WO2012/172235
PCT Pub. Date: Dec. 20, 2012

(65) Prior Publication Data
US 2014/0112756 A1 Apr. 24, 2014

(30) Foreign Application Priority Data
Jun. 16, 2011 (FR) ...................................... 11 55262

(51) Int. Cl.
*F02C 3/107* (2006.01)

(52) U.S. Cl.
CPC ........ *F02C 3/107* (2013.01); *F05D 2220/329* (2013.01)

(58) Field of Classification Search
CPC .................................. F02C 3/08; F02C 3/107
See application file for complete search history.

(56) References Cited

U.S. PATENT DOCUMENTS

| 4,141,212 A * | 2/1979 | Koschier ................. F02C 3/145 60/39.511 |
| 4,423,592 A * | 1/1984 | Evans ....................... F02C 9/28 60/39.281 |
| 4,858,428 A | 8/1989 | Paul |
| 5,222,693 A * | 6/1993 | Slutzkin ................. B01D 45/14 209/139.2 |
| 2003/0066294 A1* | 4/2003 | Mannarino ......... F04D 27/0246 60/773 |

FOREIGN PATENT DOCUMENTS

CH      277 880      9/1951

OTHER PUBLICATIONS

International Search Report dated Sep. 27, 2012 in PCT/FR12/051273 Filed Jun. 7, 2012.

* cited by examiner

*Primary Examiner* — Woody Lee, Jr.
*Assistant Examiner* — Brian O Peters
(74) *Attorney, Agent, or Firm* — Oblon, McClelland, Maier & Neustadt, L.L.P.

(57) ABSTRACT

A turboshaft engine including a low-pressure compressor, a high-pressure compressor, a low-pressure turbine, a high-pressure turbine, and a regulator for regulating a speed of rotation of the low-pressure turbine to a speed that is substantially constant. The low-pressure turbine is coupled by a first shaft to the high-pressure compressor, while the high-pressure turbine is coupled by a second shaft to the low-pressure compressor.

5 Claims, 1 Drawing Sheet

TWO-SPOOL DESIGN FOR A TURBOSHAFT ENGINE WITH A HIGH-PRESSURE COMPRESSOR CONNECTED TO A LOW-PRESSURE TURBINE

FIELD OF THE INVENTION

The invention relates to the internal structure of a turboshaft engine, and more particularly to the internal structure of a helicopter engine.

It should be observed that the term "turbojet" designates a gas turbine engine delivering thrust required for propulsion by reaction to the ejection of hot gas at high speed, whereas the term "turboshaft engine" designates a gas turbine engine that drives a drive shaft in rotation. For example, turboshaft engines are used as engines in helicopters, ships, trains, or indeed as industrial engines. Turboprops (turboshaft engines driving propellers) are also engines used as aeroengines.

STATE OF THE PRIOR ART

A conventional turboshaft engine generally comprises a low-pressure compressor and a high-pressure compressor arranged downstream from the low-pressure compressor, where "downstream" is relative to the flow direction of gas through the engine. Under certain conditions of use, a surging phenomenon appears when the pressure at the inlet to the high-pressure compressor is higher than the pressure at the outlet from the low-pressure compressor. The operation of the engine becomes unstable, possibly to such an extent that gas is discharged through the inlet to the low-pressure compressor.

This surging phenomenon can be avoided by a conventional structure for a turbojet of the two-spool type, comprising a low-pressure spool (low-pressure compressor coupled by a shaft to a low-pressure turbine) and a high-pressure spool (high-pressure compressor coupled by another shaft to a high-pressure turbine, the high-pressure compressor and the high-pressure turbine lying between the low-pressure compressor at one end and the low-pressure turbine at the other). Nevertheless, such a turbojet structure is difficult to adapt to turboshaft engines, since in normal operation, the compression ratio of a two-spool turbojet is too great compared with the compression ratio imposed on a turboshaft engine in normal operation. Specifically, the compression ratio of a two-spool turbojet is generally about 30 to 40 (e.g. in an airplane turbojet), while the compression ratio of a turboshaft engine is generally less than 20 (e.g. in a helicopter engine).

SUMMARY OF THE INVENTION

An object of the invention is to propose a turboshaft engine in which the risk of a surging phenomenon occurring between the low-pressure compressor and the high-pressure compressor is reduced or even zero.

The invention achieves its object by proposing a turboshaft engine comprising a low-pressure compressor, a high-pressure compressor, a low-pressure turbine, a high-pressure turbine, and regulator means for regulating the speed of rotation of the low-pressure turbine to a speed that is substantially constant, wherein the low-pressure turbine is coupled by a first shaft to the high-pressure compressor, while the high-pressure turbine is coupled by a second shaft to the low-pressure compressor.

It can be understood that the high-pressure compressor is arranged downstream from the low-pressure compressor, that the high-pressure turbine is arranged downstream from the high-pressure compressor, and that the low-pressure turbine is arranged downstream from the high-pressure turbine. The high-pressure turbine is the first turbine downstream from a combustion chamber. The combustion chamber is arranged, in the gas flow direction, between the high-pressure compressor and the high-pressure turbine. It can also be understood that the high-pressure turbine is subjected to variations in its speed of rotation depending on whether more or less fuel is injected into the combustion chamber.

In general, and unless specified to the contrary, the terms "upstream" and "downstream" and also "inlet" and "outlet" for an element are defined relative to the flow direction of gas through the engine.

The high-pressure compressor is mounted on the same rotary shaft as the low-pressure turbine, while the low-pressure compressor is mounted on the same rotary shaft as the high-pressure turbine. Thus, the high-pressure compressor and the low-pressure turbine rotate at the same speed of rotation, while the low-pressure compressor and the high-pressure turbine rotate at the same, other speed of rotation.

The term "substantially constant speed" means that for a predetermined operating speed, the speed might vary, but by no more than plus or minus fifteen percent (±15%). For example, in order to regulate the speed of the low-pressure turbine, the regulator means inject more or less fuel into the combustion chamber, so that the rotary assembly comprising the high-pressure turbine and the low-pressure compressor is accelerated or slowed down. Consequently, the gas flow rate is thus made greater or smaller and serves to deliver the energy necessary for the low-pressure turbine to rotate at substantially constant speed, regardless of the torque applied to the drive shaft of the engine.

Because of the regulator means, since the high-pressure compressor is mechanically coupled by the first shaft to the low-pressure turbine, the speed of the high-pressure compressor is substantially constant. Furthermore, since the low-pressure compressor is mechanically coupled to the high-pressure turbine by the second shaft, variations in the speed of rotation of the high-pressure turbine affect only the speed of rotation of the low-pressure compressor. Thus, the speed of rotation of the high-pressure compressor is substantially constant compared with the speed of rotation of the low-pressure compressor. Consequently, any risk of surging between the low- and high-pressure compressors is reduced, or even avoided. Naturally, it can be understood that for a predetermined speed of rotation of the high-pressure compressor, the speed of rotation of the low-pressure compressor lies within a predetermined range of speeds of rotation, such that the high-pressure compressor is always capable of receiving and compressing the gas coming from the low-pressure compressor.

In other words, by mechanically coupling the high-pressure compressor to the low-pressure turbine and the low-pressure compressor to the high-pressure turbine, and by using regulator means, the speed of rotation of the high-pressure compressor is more stable than the speed of rotation of the low-pressure compressor, such that any risk of pressure being too high between the low-pressure compressor and the high-pressure compressor is reduced or even zero, with surging phenomena thus being reduced or even nonexistent.

In a first a variant, the first shaft passes coaxially through the second shaft, the first and second shafts defining an axial direction, the high-pressure compressor, the low-pressure compressor, the high-pressure turbine, and the low-pressure turbine being arranged in that order along the axial direction.

Compared with conventional two-spool turbojets, the positions of the high- and low-pressure compressors in the axial direction are inverted, while the high- and low-pressure turbines are arranged in the same order. In this first variant, the first shaft is central, thereby making it easier to connect this shaft for transmitting driving force (cf. power takeoff) in particular at the front of the engine (i.e. at its end remote from the turbines relative to the compressors in the axial direction).

In a second variant, the second shaft passes coaxially through the first shaft, the first and second shafts defining an axial direction, the low-pressure compressor, the high-pressure compressor, the low-pressure turbine, and the high-pressure turbine being arranged in that order along the axial direction.

Compared with conventional two-spool turbojets, the positions of the high- and low-pressure compressors in the axial direction are inverted, while the high- and low-pressure turbines are arranged in the same order. In this second variant, the combustion chamber is advantageously are arranged at the rear end of the engine (i.e. at its end remote from the compressors relative to the turbines). This facilitates access to the combustion chamber for maintenance or replacement.

Advantageously, the turboshaft engine of the second variant has a gas ejection channel arranged downstream from the low-pressure turbine, and a gas duct connecting the outlet from the high-pressure compressor to a combustion chamber arranged upstream from the high-pressure turbine, the gas duct passing through the gas ejection channel via a heat exchanger in order to transfer heat from the gas coming from the low-pressure turbine to the gas flowing in the gas duct.

The heat exchanger provides thermal contact between the gas duct and the gas ejection channel. The heat exchanger makes it possible to heat the gas coming from the high-pressure compressor before causing it to penetrate into the combustion chamber, thereby serving to reduce heat losses and to increase the efficiency of the engine.

Preferably, the turboshaft engine of the invention is a helicopter engine.

BRIEF DESCRIPTION OF THE DRAWINGS

The invention and its advantages can be better understood on reading the following detailed description of various embodiments of the invention given as non-limiting examples. The description makes reference to the accompanying figures, in which.

DETAILED DESCRIPTION OF EMBODIMENTS

Figure 1:
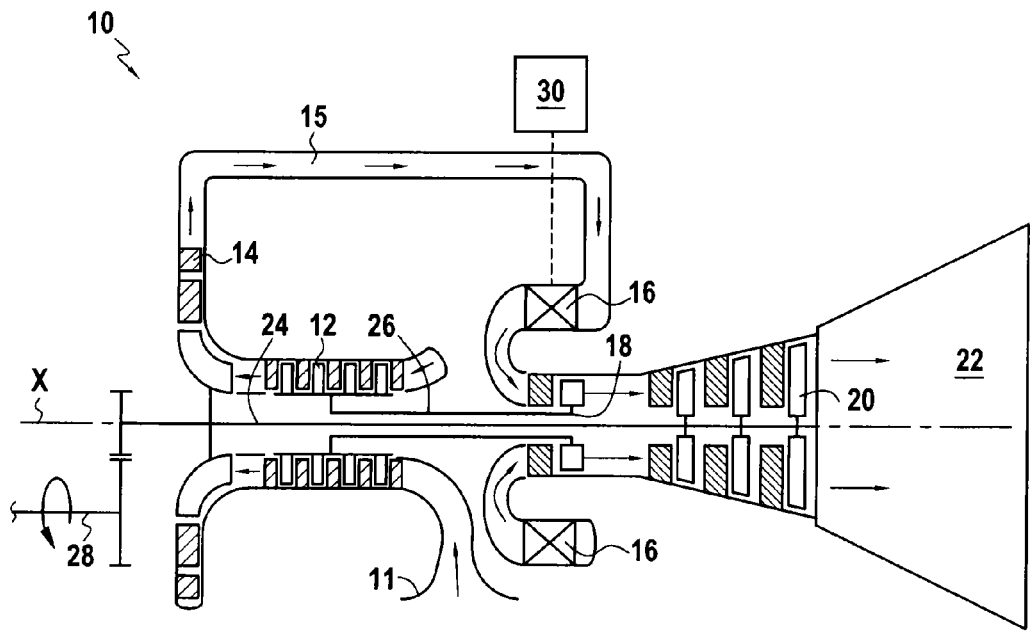
FIG. 1 is a diagrammatic view of a first embodiment of the turboshaft engine of the invention.

FIG. 1 shows a first embodiment of the turboshaft engine of the invention corresponding to the first above-described variant. The arrows show the flow direction of gas within the engine 10. Air enters the engine 10 via an air inlet channel 11, and combustion gas is ejected via a gas ejection channel 22. The turboshaft engine 10 is a helicopter engine.

In the gas flow direction, the engine 10 comprises in succession a low-pressure compressor 12, a high-pressure compressor 14, a combustion chamber 16, a high-pressure turbine 18, and a low-pressure turbine 20. In this example, the high-pressure compressor 14 is a centrifugal compressor, while the low-pressure compressor 12 is an axial compressor. Naturally, depending on the variant, the high-pressure compressor could be axial and/or the low-pressure compressor could be centrifugal. A gas duct 15 connects the outlet from the high-pressure compressor 14 to the inlet of the combustion chamber 16 in order to bring the compressed air from the high-pressure compressor 14 to the combustion chamber 16. It should be observed that in FIGS. 1 and 2, the stationary elements of the compressors 12 and 14 and of the turbines 18 and 20 are shaded, while the movable elements are not shaded.

The high-pressure compressor 14 is coupled in rotation with the low-pressure turbine 20 by a first shaft 24. The low-pressure compressor 12 is coupled in rotation with the high-pressure turbine 18 by a second shaft 26. The first shaft 24 passes coaxially inside the second shaft 26, the first and second shafts 24 and 26 defining an axial direction X (or axis X). In this first embodiment, from left to right in FIG. 1, the high-pressure compressor 14, the low-pressure compressor 12, the high-pressure turbine 18, and the low-pressure turbine 20 are arranged in that order along the axial direction X.

The first shaft 24 connected to the low-pressure turbine 20 is the drive shaft of the turboshaft engine 10. This first shaft 24 engages with a transmission shaft 28 driving the rotor of a helicopter (not shown), e.g. via a gearbox as represented diagrammatically in FIG. 1, or indirectly (not shown). In a variant, a clutch is arranged between the first shaft 24 and the transmission shaft 28 for the purpose of starting the engine. In this example, the connection between the first shaft 24 and the transmission shaft 28 is made at the front of the engine 10, i.e. to the left in FIG. 1.

Regulator means 30 regulate the injection of fuel into the combustion chamber 16 so that the low-pressure turbine 20, and thus the helicopter rotor, rotate at substantially constant speed regardless of the opposing torque applied by the helicopter rotor on the first shaft 24. Thus, regardless of the pitch angle of the helicopter rotor blades for various helicopter flights regime conditions, and thus regardless of the torque proposed by the helicopter rotor on the first shaft 24, said rotor rotates at constant speed.

Because of the regulator means 30 and the coupling of the low-pressure turbine 20 with the high-pressure compressor 14 via the first shaft 24, the high-pressure compressor 14 rotates at constant speed. Since the high-pressure turbine 18 is coupled to the low-pressure compressor 12, any variations in the speed of rotation of the high-pressure turbine 18 due to the regulation of fuel injection into the combustion chamber 16 has an impact on the low-pressure compressor 12. Thus, providing the high-pressure compressor 14 is operating normally, i.e. is capable of compressing the gas coming from the low-pressure compressor 12 over the entire range of variation in the speed of rotation of the low-pressure compressor 12 at normal power or at intermediate power (i.e. partial or half-power), surging phenomena are avoided between the low- and high-pressure compressors 12 and 14.

Figure 2:
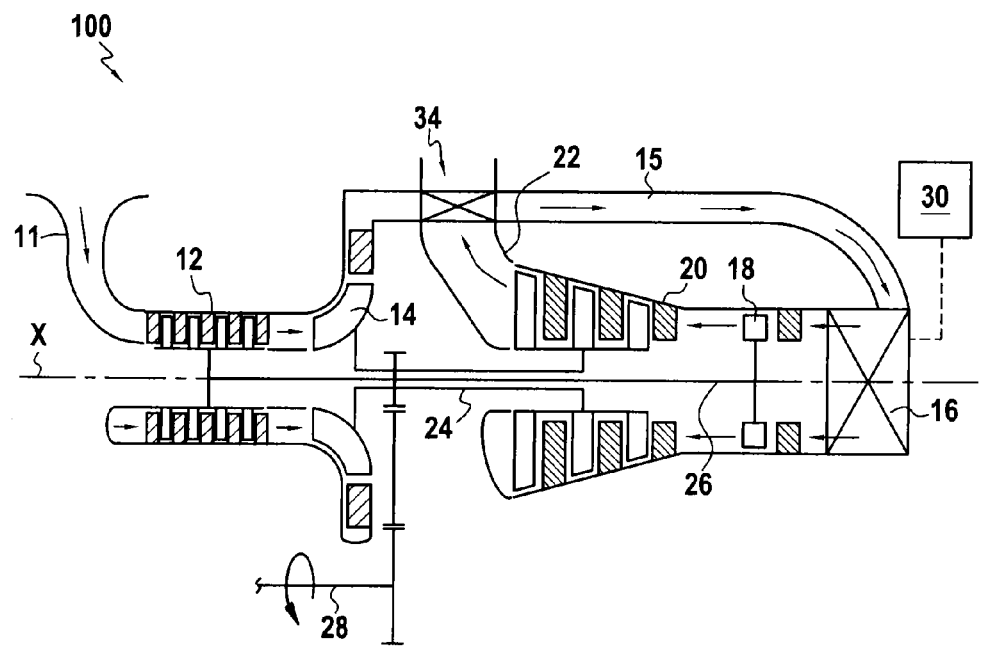
FIG. 2 is a diagrammatic view of a second embodiment of the turboshaft engine of the invention.

FIG. 2 shows a second embodiment of the turboshaft engine of the invention corresponding to the second above-described variant. The arrows show the flow direction of gas within the engine 100. Elements that are common with the first embodiment are not described again and they retain their reference numbers unchanged, and likewise their operation is not described again. As in the first embodiment, the low-pressure compressor 12 is an axial compressor, but in a variant it could be replaced with a centrifugal compressor. Likewise, the high-pressure compressor 14 is a centrifugal compressor, but in a variant it could be replaced with an axial compressor.

In the engine 100, the second shaft 26 passes coaxially inside the first shaft 26, the first and second shafts 24 and 26 defining the axial direction X (or axis X). In this second embodiment, from left to right in FIG. 2, the low-pressure compressor 12, the high-pressure compressor 14, the low-pressure turbine 20, and the high-pressure turbine 18 are arranged in that order along the axial direction X. In this example, the combustion chamber 16 is arranged at the rear end of the engine 100, i.e. to the right in FIG. 2.

The gas duct 15 passes through the ejection channel 22, passing via a heat exchanger 34. Naturally, the heat exchanger 34 does not close off the ejection channel 22, and the exhaust gas escapes freely to the outside by flowing over at least part of the heat exchanger 34. Thus, the gas ejected by the engine 100 comes into direct thermal contact with the heat exchanger 34 and delivers heat to the gas flowing in the duct 15 via the heat exchanger 34. In a variant, the gas duct 15 does not pass through the ejection channel 22 and no heat transfer is performed.

It should be observed that the air inlet channel 11 and the gas duct 15 of the first and second embodiments, and the ejection channel 22 of the second embodiment are not bodies of revolution, thus making it possible, in particular, to provide space for receiving the air inlet channel 11 and the gas duct 15 in the first embodiment, or the mechanical transmission between the shafts 24 and 28 in the second embodiment. In variants, the air inlet channel 11, the gas duct 15, and/or the ejection channel 22 may be of other shapes, optionally being bodies of revolution.

The invention claimed is:

1. A turboshaft engine comprising:
a low-pressure compressor;
a high-pressure compressor;
a combustion chamber;
a low-pressure turbine;
a high-pressure turbine;
a regulator which regulates an amount of fuel injected into the combustion chamber such that a speed of rotation of the low-pressure turbine is substantially constant;
a first shaft which couples the low-pressure turbine to the high-pressure compressor; and
a second shaft which couples the high-pressure turbine to the low-pressure compressor,
wherein the first shaft passes coaxially inside the second shaft, the first and second shafts defining an axial direction,
wherein the first shaft is longer than the second shaft in the axial direction,
wherein the high-pressure compressor, the low-pressure compressor, the high-pressure turbine, and the low-pressure turbine are arranged in that order along the axial direction, and
wherein the high-pressure compressor is a centrifugal compressor.

2. A turboshaft engine according to claim 1, forming a helicopter engine.

3. A turboshaft engine according to claim 1, wherein the low-pressure compressor is an axial compressor.

4. A turboshaft engine according to claim 2, wherein the first shaft engages with a transmission shaft driving a rotor of the helicopter.

5. A turboshaft engine according to claim 4, wherein a connection between the first shaft and the transmission shaft is in front of the high-pressure compressor in the axial direction.

* * * * *